United States Patent
Rasband et al.

(10) Patent No.: US 8,833,652 B2
(45) Date of Patent: Sep. 16, 2014

(54) PRODUCT INFORMATION SYSTEM AND METHOD USING A TAG AND MOBILE DEVICE

(75) Inventors: Paul Brent Rasband, Lantana, FL (US); Stewart E. Hall, Wellington, FL (US); Wing Kei Ho, Boynton Beach, FL (US); Mohammad Mohiuddin, Boynton Beach, FL (US); Nancy Lee Van Nest, Delray Beach, FL (US); Manjuprakash Rama Rao, Bangalore (IN); Timothy J. Relihan, Loxahatchee, FL (US); Richard L. Copeland, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 32 days.

(21) Appl. No.: 13/215,847

(22) Filed: Aug. 23, 2011

(65) Prior Publication Data
US 2013/0048721 A1    Feb. 28, 2013

(51) Int. Cl.
*G06K 7/00* (2006.01)
*G06F 17/30* (2006.01)
*G06Q 30/06* (2012.01)
*G06Q 30/02* (2012.01)

(52) U.S. Cl.
CPC .......... *G06F 17/30879* (2013.01); *G06Q 30/06* (2013.01); *G06Q 30/0241* (2013.01)
USPC ........... 235/383; 235/375; 235/380; 235/435; 235/451; 235/462.01

(58) Field of Classification Search
USPC .................. 235/375, 383, 435, 439, 454, 462
See application file for complete search history.

(56) References Cited

U.S. PATENT DOCUMENTS

| | | |
|---|---|---|
| 2002/0117544 A1 | 8/2002 | Wolf et al. |
| 2006/0055552 A1* | 3/2006 | Chung et al. ............... 340/686.1 |
| 2007/0063050 A1* | 3/2007 | Attia et al. ............... 235/462.46 |
| 2008/0065974 A1* | 3/2008 | Campbell ..................... 715/200 |
| 2008/0116278 A1* | 5/2008 | Epshteyn ................. 235/462.25 |
| 2009/0140035 A1* | 6/2009 | Miller ............................ 235/375 |
| 2010/0010964 A1 | 1/2010 | Skowronek et al. |
| 2010/0082447 A1 | 4/2010 | Lin et al. |
| 2010/0161434 A1* | 6/2010 | Herwig et al. .................. 705/20 |
| 2010/0287057 A1 | 11/2010 | Aihara et al. |
| 2011/0066504 A1 | 3/2011 | Chatow et al. |
| 2012/0067944 A1* | 3/2012 | Ross ............................. 235/375 |

FOREIGN PATENT DOCUMENTS

WO    03-050734 A1    6/2003

OTHER PUBLICATIONS

EPO International Search Report dated Feb. 7, 2013 for corresponding appln PCT/US2012/052307.

* cited by examiner

*Primary Examiner* — Michael G Lee
*Assistant Examiner* — Matthew Mikels
(74) *Attorney, Agent, or Firm* — Alan M. Weisberg; Christopher & Weisberg, P.A.

(57) ABSTRACT

A product information system including a server having an item database that stores at least one item identifier and corresponding item data for at least one item. Also, the item database is associated with a predetermined vendor. The server also includes a receiver that receives a message including tag data captured from a tag by a portable wireless device. The tag data includes an item identifier. Also, the server includes a processor that operates, in response to the received message, to select item data from the item database that corresponds to the received item identifier. The server also includes a transmitter that transmits the selected item data to the portable wireless device.

26 Claims, 5 Drawing Sheets

PRODUCT INFORMATION SYSTEM AND METHOD USING A TAG AND MOBILE DEVICE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a product information system, and more specifically to a method and system for providing item information to a mobile device in response to a request.

BACKGROUND OF THE INVENTION

The retail shopping environment experience is often the deciding factor as to whether a retail consumer will purchase a product. For example, the consumer may casually browse the store when a product catches the consumer's attention. If the consumer is familiar with the product and brand through previous research such as consumer ratings, then the consumer is likely to make a definitive decision whether or not to purchase the product. For example, the consumer's past research may indicate that the product is highly reliable, thereby likely influencing the consumer to purchase the product. However, as often happens, the consumer is unfamiliar with the product and/or brand. In this case, the consumer will have to rely on the limited information displayed on the product itself, product box and/or displayed by the store. Often, such limited information does not include product information that is likely to influence the consumer to purchase the product, e.g., consumer ratings. As such, a lack of product information availability to the consumer, while casually shopping, may negatively impact the consumer buying experience and may dissuade the consumer from purchasing a product.

More and more, retail consumers use mobile phones to obtain information about an unfamiliar product while at the retail store. For example, consumers may search the internet on their mobile phones for more information about a particular product while still at the store. However, simply searching for product information on the internet via a search engine may be time consuming for the consumer, cost the consumer money for accessing the mobile device network and still may not provide the consumer with product information that is likely to influence the consumer's decision to purchase the product. Moreover, the search engine may recover irrelevant information, information from untrusted sources/websites, among other websites not associated with the retail store, thereby possibly providing the consumer inaccurate product information.

Some stores provide the consumer with a map of the store layout on a mobile phone display indicating the general location of the product within the store, thereby helping guide customers to the desired product. A mobile phone readable tag may even be provided at a location in the store to allow the mobile phone to pinpoint its location on a store map displayed on the mobile device. Also, some stores track inventory and location of the products within the store and use this information to show a consumer where to look on the store map for a desired product. However, using the mobile phone map of the store typically requires the consumer to be familiar with the product, i.e., the consumer is looking for a certain product by name. As such, consumers that are unfamiliar with items in the store may not get much use of the mobile phone map because the consumer does not known what item to locate.

Also, other stores provide a mobile phone application that notifies the consumer when the product falls below a threshold price. For example, the consumer may set a threshold price for a product of interest and the mobile phone application will notify the consumer when the product price falls below the threshold price. This type of mobile phone application requires the consumer to pre-configure a threshold price for each product. This process is time consuming, especially when the consumer is interested in many products. Moreover, this mobile phone application requires the consumer to be familiar with the product in order to be able to appropriately set the threshold price. As such, current mobile device applications are of limited use to causal shoppers that are not very familiar with the products within the store.

Even if the consumer manages to obtain product information via the internet and locates the item on a map displayed on the mobile device, the consumer still has to stand in the checkout line in order to finish the purchase. This is a time consuming process that often deters from the consumer's positive buying experience. Also, if the checkout lines are too crowded, the consumer may end up leaving the store without purchasing any products in order to avoid standing in the checkout line.

Accordingly, it is desirable to have a system and method that efficiently provides consumer requested product information and also enables the consumer to purchase the corresponding product in an expeditious manner.

SUMMARY OF THE INVENTION

The present invention advantageously provides a method and system for efficiently providing consumer requested product information and also enables the consumer to purchase the corresponding product in an expeditious manner.

According to one embodiment, there is provided a product information system. The system includes a server that has an item database that stores at least one item identifier and corresponding item data for at least one item. Also, the item database is associated with a predetermined vendor. The server also includes a receiver that receives a message including tag data captured from a tag by a portable wireless device. The tag data includes an item identifier. Also, the server includes a processor that operates, in response to the received message, to select item data from the item database that corresponds to the received item identifier. The server also includes a transmitter that transmits the selected item data to the portable wireless device.

According to another embodiment, a mobile device application method is provided for requesting product information. The method includes capturing tag data with a portable wireless device from a tag in which the tag data includes an item identifier. The method also includes transmitting the tag data to a server associated with a predetermined vendor. Also, the method includes receiving item data in response to the transmitted tag data. The item data corresponds to the item identifier.

According to yet another embodiment, a method is provided for providing product information to a mobile device. The method includes storing at least one item identifier and corresponding item data for at least one item. Also, the item database is associated with a predetermined vendor. The method also includes receiving a message in which the message includes tag data captured from a tag by a portable wireless device. Also, the tag data includes an item identifier. The method also includes selecting item data from the item database corresponding to the received item identifier in response to the received message. Also, the method includes transmitting the selected item data to the portable wireless device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
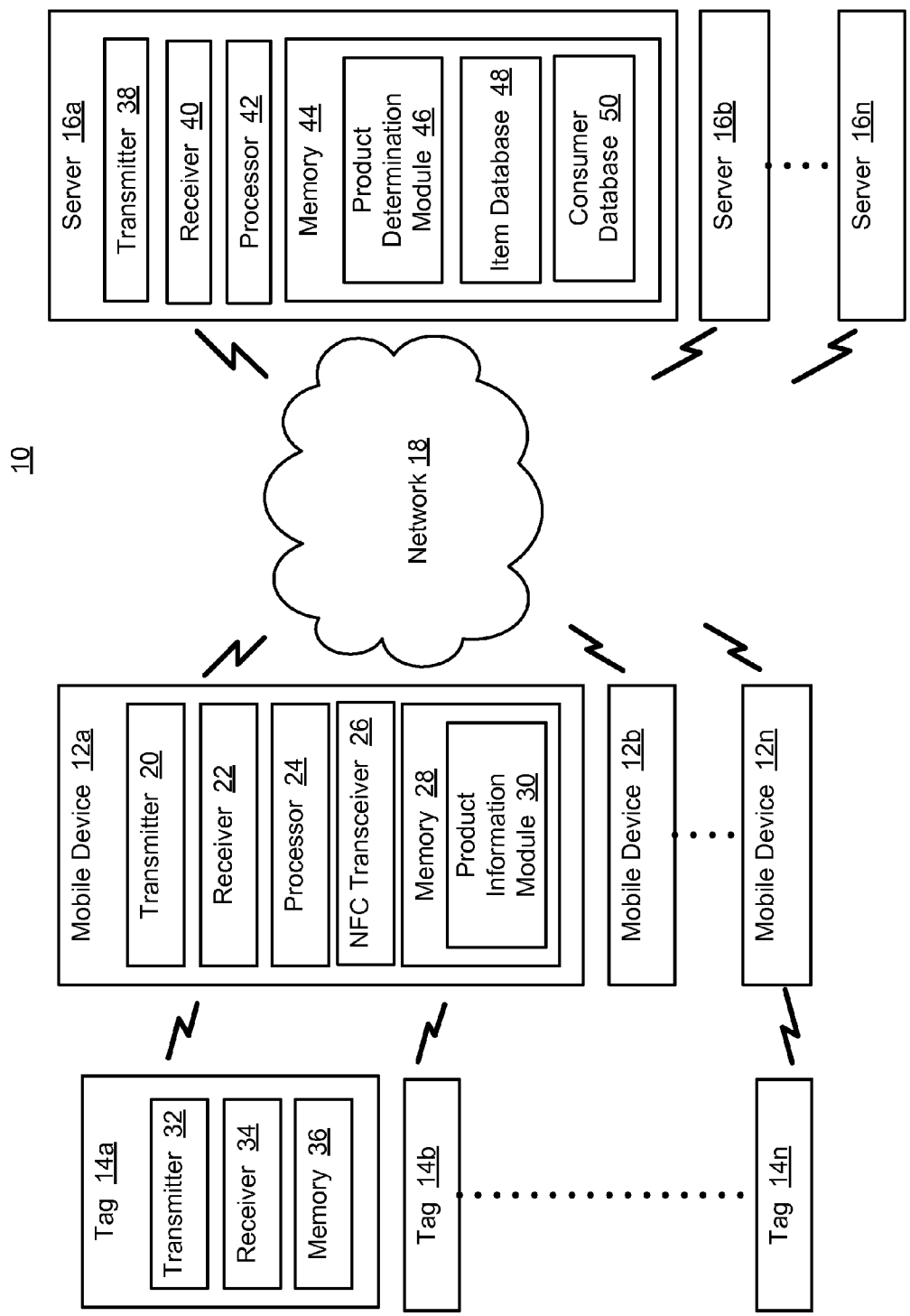
FIG. 1 is a block diagram of an exemplary product information distribution system constructed in accordance with the principles of the invention.

Before describing in detail exemplary embodiments that are in accordance with the present invention, it is noted that the embodiments reside primarily in combinations of apparatus components and processing steps related to implementing a system and method for providing consumer requested product information in an efficient manner and also enables the consumer to purchase the corresponding product in an expeditious manner. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for efficiently providing consumer requested product information. Also, the present invention advantageously provides a method and system for enabling the consumer to purchase the corresponding product in an expeditious manner.

Referring now to the drawing figures in which like reference designators refer to like elements there is shown in FIG. 1 an exemplary item information distribution system constructed in accordance with the principles of the present invention and designated generally as "10." System 10 may include one or more mobile devices 12a to 12n (collectively referred to as "mobile device 12"), one or more tags 14a to 14n (collectively referred to as "tag 14"), and one or more servers 16a to 16n (collectively referred to as "server 16"). System 10 may also include network 18 that supports communication between mobile device 12 and server 16. For example, network 18 may be an internet protocol (IP) network that may be established as a wide area network (WAN) and/or local area network (LAN), among other IP-based networks. Also, network 18 may be an in-store network that allows consumers within or proximate the store to access server 16 and/or the internet.

Mobile device 12 may be a device such as a portable wireless device, mobile phone, personal digital assistant (PDA), laptop, among other devices that display text and/or graphical content. Mobile device 12 may communicate with tag 14 and may also communicate with server 16, via network 18, using internet protocols known in the art. Mobile device 12 may include transmitter 20, receiver 22, processor 24, near-field communication (NFC) transceiver 26, memory 28 and product information module 30, among other hardware and software. Product information module 30 may be a mobile device application. For example, product information module 30 may be: downloaded to mobile device 12 from network 18; transferred to mobile device 12 from removable memory (not shown) such as universal serial bus (USB) flash memory, secure data (SD) memory; downloaded from tag 14 that may store product information module 30, in memory 36, for transmission directly to mobile device 12 upon scanning, and the like. Moreover, product information module 30 may be preinstalled on mobile device 12 in memory 28, e.g., the phone manufacturer or provider installs product information module 30 prior to sale to the end user.

In particular, transmitter 20 may transmit data packets to network 18 and receiver 22 may receive data packets from network 18. Also, transmitter 20 and receiver 22 functionality may be replaced by a transceiver (not shown). Processor 24 may include a central processing unit (CPU) for executing computer program instructions stored in memory 28, as is well known in the art. NFC transceiver 26 may transmit and receive short range radio communications. For example, the NFC transceiver may communicate with tag 14 up to 30 cm away via short range radio signals. The distance of short range radio communications between NFC transceiver 26 and tag 14 may be varied depending on various factors such as the size of mobile device, mobile device antenna, NFC transceiver power requirements, among other factors. It is understood that the NFC distance is not limited to 30 cm, e.g., may be greater than 30 cm.

In particular, NFC transceiver 26 enables inductive-coupling between NFC transceiver 26 and tag 14 such as to allow for two-way interactions between the two. The two-way interactions may include transmitting data in response to receiving an interrogation signal, receiving data in response to transmitting an interrogation signal, among other two-way interactions, i.e., capture tag data from the tag. For example, NFC transceiver 26 may transmit the interrogation signal to tag 14 in which tag 14 responds by transmitting data to NFC transceiver 26, as is discussed in detail below. Alternatively, the functionality of NFC transceiver 26 may be implemented using transmitter 20 and receiver 22 such that an additional NFC transceiver is not required. For example, transmitter 20 and receiver 22 may communicate with both network 18 and tag 14.

Also, mobile device 12 includes memory 28 that may include non-volatile and volatile memory. For example, non-volatile memory may include a hard drive, memory stick, flash memory and others known in the art. While volatile memory may include random access memory and others known in the art. Memory 28 may store product information module 30, among other modules. For example, memory 28 may store computer program instructions that are executed by processor 24. Program instructions, when executed by processer 24, may provide the functionality for product information module 30. Product information module 30 is discussed in more detail below with reference to FIG. 4.

Tag 14 may include transmitter 32, receiver 34 and memory 36. In particular, transmitter 32, receiver 34 and memory 36 may function substantially the same as the corresponding mobile device 12 components, with size and performance being adjusted based on design needs, e.g., may receive signals, transmit signals and store tag data. Tag 14 may be a standalone tag or integrated into hardware such as an electronic price tag. Moreover, tag 14 may include NFC tags, RFID tags, among other tags that may receive and transmit signals via transmitter 32 and receiver 34. For example, NFC tag receiver 34 may receive a short range radio communication signal from NFC transceiver and, in response, may transmit tag data to the NFC transceiver via transmitter 32, as is discussed in more detail below with respect to FIG. 4. Also, RFID tag may transmit an RFID signal in response to a received RFID interrogation signal. Specifically, memory 36 may store tag data such as item identifier or identification (ID), manufacture ID, item name, item data, and other data, i.e., tag 14 is encoded with tag data. For example, item data may include graphical, video and/or literary item data such as customer reviews, video advertisement, uniform resource locators (URLs), web addresses, among other content that may be transmitted to and displayed on mobile device 12. In particular, the URL or web address may include a script address such that when the phone scans or bumps the NFC tag, the application in the phone sends a script request to server 16. The script may cause a set of program instructions to be executed on mobile device 12 and/or server 16. For example, the script may be a common gateway interface (CGI) script. Also, the item ID may be a unique identification character sequence for an item.

Also, tag data stored on tag 14 may include computer program instructions that when received and processed by mobile device 12, via processor 24, cause mobile device 12 to perform particular functions. For example, the computer program instructions in tag data may be configuration instructions that configure and format the way mobile device 12 displays information to mobile device users. Configuration and formatting instructions may include mobile device display screen layouts, application menu preferences, graphics layout that demand significant processing (graphics-rich), graphics layout that demand less processing (graphics-lean). Also, each store, retailer or manufacture may provide tag 14 with stored customized computer program instructions such that the configuration and formatting of the mobile device application may be updated by scanning tag 14, e.g., each store may have a customized mobile device application layout.

Also, tag 14 may include optically readable tags such as a barcode, stock-keeping unit (SKU), quick response (QR) code, one dimensional barcode, two dimensional barcode, universal product code (UPC) and other optically readable codes. In particular, NFC transceiver 26 may be replaced by an optical barcode scanner (not shown), or the optical barcode scanner may be added to mobile device 12 in addition to NFC transceiver 26. For example, optical barcode scanner may be a digital camera that captures an image of the barcode in which product information module 30 decodes the captured image, via methods known in the art, to determine tag data.

Moreover, tag 14 may be an active, passive, semi-active tag, among other types of tags. For example, an active tag may include tags that use batteries to power their respective circuitry throughout the tag interrogation process. Semi-active tags may include tags that use batteries to power their respective circuitry through part of the tag interrogation process. For example, the batteries may provide the power needed to transmit an encoded data signal to the scanner or reader in response to receiving an interrogation signal. A passive tag may rely entirely on the scanner's or reader's interrogation signal to power its circuitry, e.g., relies on the signal transmitted by NFC transceiver 26 to power its respective circuitry.

Also, tag 14 may be configurable, i.e., tag 14 is programmable. In particular, the NFC tag may be programmed wirelessly such as by a store employee's mobile device 12 using wireless sensor protocols or using other tag programming methods known in the art. Also, the in-store network may periodically communicate with tag 14 such as to update tag data, e.g., may communicate with tag 14 through the in-store wireless network or a store employee's wireless device (not shown).

System 10 also includes server 16. Server 16 may include transmitter 38, receiver 40, processor 42 and memory 44. In particular, transmitter 38, receiver 40, processor 42 and memory 44 may function substantially the same as the corresponding mobile device 12 components, with size and performance being adjusted based on design needs. Memory 44 may store product determination module 46, item database 48 and consumer database 50. Product determination module 46 may be program instructions that when executed by processor 42 determine and select item data corresponding to received tag data as discussed with respect to FIG. 3. Item database 48 stores item data corresponding to one or more items. For example, item data may include item price, item specifications, customer reviews of the item, item video, hyperlinks to websites containing information about the item, graphical content, literary content, item identifiers, and other item data. In particular, the stored item identifiers may be a unique character sequence for an item.

Also, item database 48 may also store item metrics corresponding to items. For example, item metrics may include the number of times tag 14 associated with an item is scanned within a defined time period, whether an item is in stock at a particular store, number of times an item has been added to a virtual shopping cart (discussed below with respect to FIG. 5), among other metrics. In particular, item metrics may be updated by an analytics module (not shown) stored in memory 44 that tracks the number of items in stock at one or more stores. Also, item metrics may be used and updated by product determination module 46, among other modules. For example, product manufacturers (or other parties) may transmit a message to server 16, via network 18, requesting updated item metrics for a particular item. In response, server 16 may transmit, via network 18, the requested item metrics to a product manufacturer server or device (not shown) for use by the manufacturer.

Moreover, item database 48 may be associated with a predetermined vendor. For example, item database 48 may be associated with a particular vendor such that the vendor is responsible for configuring server 12 to provide item data to mobile device 12. In particular, each vendor may have an associated item database 48 stored in a separate vendor server (e.g., 16b, 16n). For example, each vendor may provide their own product information from their respective server such that server 16 (e.g., 16a, 16b) functions as a network portal for distributing product information from the vendor server to mobile device 12. Specifically, server 16 may forward a request message including a specific item ID to a particular vendor server associated the item ID. In response to the forwarded request message, the particular vendor server may transmit item data to mobile 12 via server 16 and network 18. Alternatively, item database 48 may be associated with several vendors such that each vendor may predetermine the item data that corresponds to a specific item identifier stored in item database 48.

Consumer database 50 may store consumer data about consumers, such as mobile device identification number, personal identification number, consumer account number, credit card information, financial institution information, among other data. Also, consumer database 50 may store conduct data for individual consumers, i.e., type of consumer data. For example, the conduct data may include tag 14 that have been scanned by a consumer within a defined period of time, whether tag 14 were scanned more than once, items that have been purchased by the consumer, average price of purchased items, most commonly purchased brands, among other data. Moreover, while item database 48 and consumer database 50 are shown stored in memory 44, one of both of the databases may be stored in another storage device, such as another server, external memory and the like.

Server 16 functionality may be performed by a single server or distributed among multiple servers or computing devices. For example, server 16 functionality may be performed by an in-store or off-site server. Alternatively, server 16 functionality may be performed by several computing devices that may be located in the same general location or different locations, e.g., cloud computing. In other words, each computing device may perform one or more particular sub-processes of server 16, and may communicate with each other via network 18. As such, server 16 may be a system of components that functions collectively to receive, process and respond to request messages for item data, as discussed in detail below with respect to FIG. 3.

Figure 2:
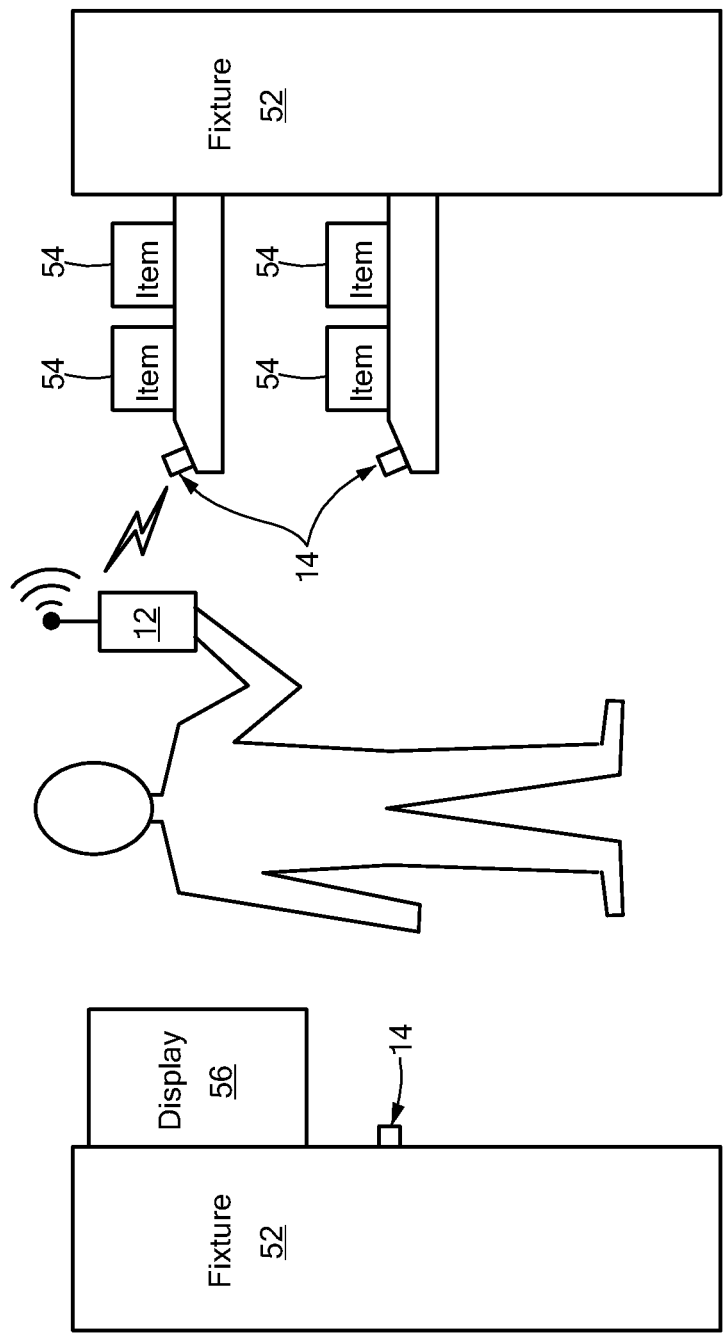
FIG. 2 is a diagram of an exemplary store arrangement using a product information distribution system constructed in accordance with the principles of the invention.

An exemplary item information distribution system deployed in a store environment is described with reference to FIG. 2. In particular, mobile 12 scans tag 14 that may be affixed or removably affixed to various objects and/or fixture(s) 52. For example, tag 14 may be removably affixed to fixture 52 such as a shelf edge as is commonly found in retail stores. Tag 14 may be removably affixed to the shelf edge on fixture 52 proximate item 54 corresponding to the tag data encoded in tag 14, e.g., item 54 corresponds to an item ID encoded/stored in tag 14. Item 54 may be a retail item such as clothes or item in packaging, displayed item as a painting, clothes, among other items. Also, tag 14 may be removably affixed to fixture 52 proximate one or more items 54. For example, fixture 52 may be part of display 56 such that consumers may scan a portion of fixture 52 to request additional information about displayed items. Moreover, tag 14 may be affixed or removably affixed directly to item 54, item 54 tag, item 54 security tag and the like.

Figure 3:
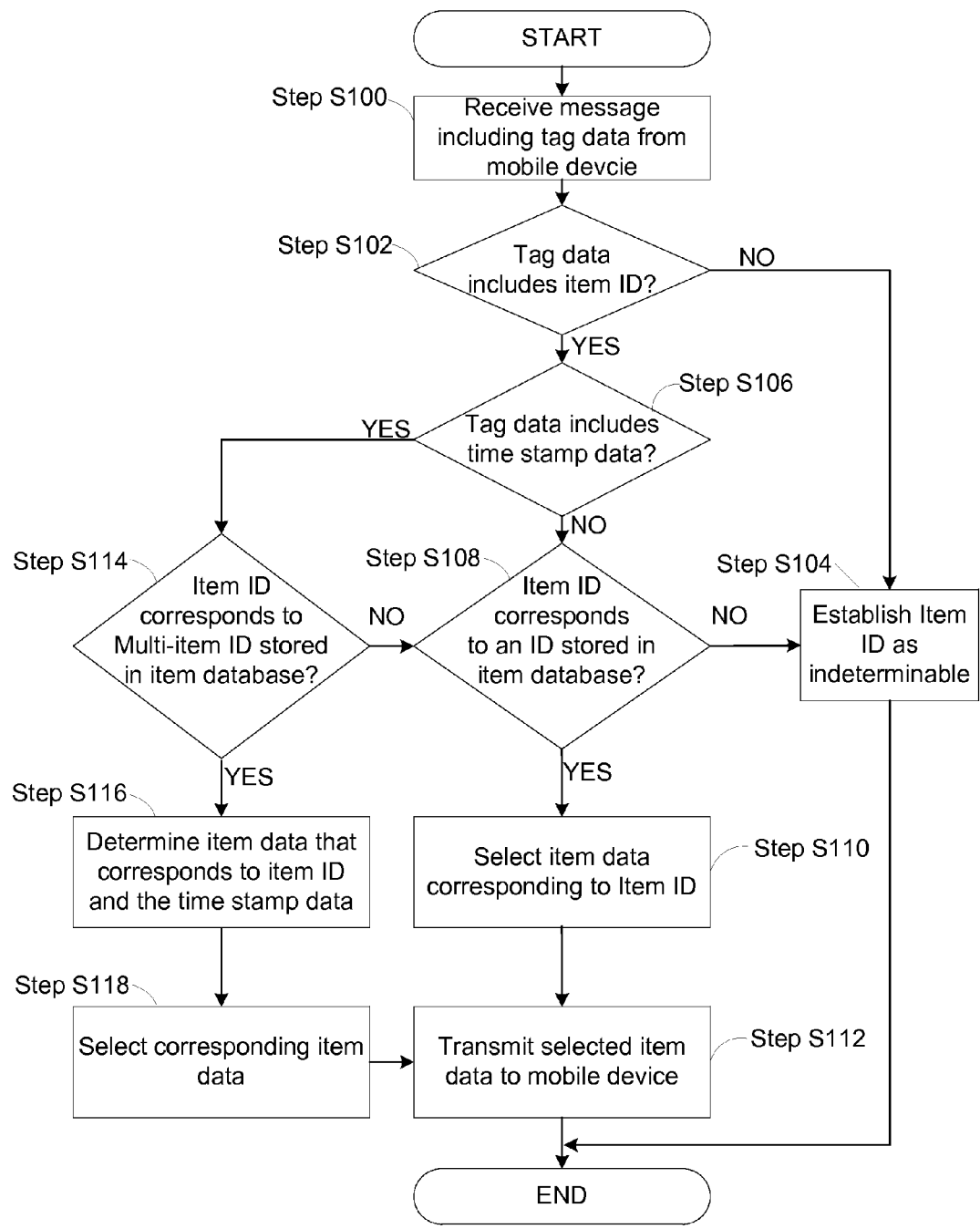
FIG. 3 is a flow chart of an exemplary process of the present invention for providing stored item data to a mobile device.

An exemplary process for determining and selecting item data is described with reference to FIG. 3. Mobile device 12 initiates the determining and selecting process by transmitting a request message to server 16, i.e., server 16 receives request message (Step S100).

For example, a consumer may use his/her mobile device 12 to scan tag 14. Mobile device 12 transmits tag data encoded in the request message to server 16, as is described in more detail below with respect to FIG. 4. The received request message is processed by server 16 to determine tag data that is included in the request message. In particular, a determination is made whether received tag data includes a received item identifier or identification code ("received item ID") (Step S102). If it is determined no received item ID is included in the received tag data, the received item ID is established as an indeterminable item ID (Step S104). In particular, server 16 may store the received tag data of item IDs that have been established as indeterminable, thereby enabling server 16 to track all indeterminable item IDs and item metrics associated with the indeterminable IDs such as number of scans, item data, and the like. Moreover, server 16 may provide the indeterminable IDs and item metrics to product manufacturers, retailers and the like via network 18. For example, an indeterminable item ID may correspond to an item that has no item data stored in item database 48 because the product manufacturer has not provided any item data. Therefore, providing the indeterminable item ID and item metrics to the product manufacturer will notify the manufacturer that item data is needed, i.e., may encourage the manufacturer to provide item data that may be stored in item database 48. Also, a network administrator may be notified of the indeterminable item ID. For example, the network administrator may be notified that tag 14 may need to be checked or configured.

However, if the received item ID is determined to be included in the processed request message, a determination is made whether the request message includes time stamp data (Step S106). Time stamp data may include data that indicates the time and/or date the received item ID was scanned or captured by mobile device 12, e.g., time stamp based on the mobile device clock. If time stamp data is determined not to be included in the request message, a determination is made whether the received item ID corresponds to an item ID stored in item database 48 (Step S108). For example, product determination module 46 may search item database 48 and compare stored item identifications (IDs) with the received item ID, thereby determining the corresponding stored item ID, e.g. determines whether any stored item IDs match the received item ID. However, if the received item ID has no corresponding stored item ID, the received item ID is established as an indeterminable item ID (Step S104). Also, a network administrator may be notified. For example, the received item ID corresponds to new item 54 or item data that has not been entered into item database 48; therefore, a network administrator may be notified such that item database 48 may be updated. Also, server 16 may update item database 48 with item data corresponding to new item 54 in response to determining the received item ID has no corresponding stored item ID, i.e., is indeterminable.

If it is determined the received item ID corresponds to a stored item ID, the stored item data corresponding to the stored item ID is selected (Step S110). In particular, each stored item ID may correspond to item data stored on item database 48. For example, each stored item ID may correspond to item data such as specific graphical, video and/or literary item data stored in item database 48, e.g., customer reviews, video advertisement, video of item 54 being used, uniform resource locators (URLs) among other content that may be transmitted to and displayed on mobile device 12.

Moreover, selected item data may also be determined based, in part, on advertisement criteria (not shown) stored in memory 44 that uses conduct data to customize selected item data to transmit to the mobile device user. For example, conduct data may be stored in consumer database 50 that indicates the mobile device has scanned a particular tag 14 several times to thereby create a scanning history, but that the user has not purchased the item corresponding to scanned tag 14. The conduct data therefore includes the scanning history. In response, server 16 may apply advertisement criteria that requires an item coupon (specific item data) to also be included in the selected item data because the same mobile device 12 has scanned the same tag 14 but has not purchased the item, e.g., has not purchased the item via virtual shopping cart. The advertisement criteria may also include other thresholds that determine, in part, the selected item data that is transmitted to mobile device 12. For example, the advertisement criteria may require a particular advertisement (e.g., special deal) be transmitted to a specific mobile device 12 upon receiving a scanned item ID because conduct data indicates the specific mobile device user has purchased certain items via the virtual shopping cart a particular number times within a predefined time period. Also, the advertisement criteria may be updated by the network administrator, product manufacturer and the like, via network 18, as needed. The selected stored item data is transmitted to mobile device 12 for presentation on the display of mobile device display 12 (Step S112).

Referring back to Step S106, if time stamp data is determined to be included in the received message, a determination is made whether the received item ID corresponds to a multi-item ID stored in item database 48 (Step S114). A multi-item ID is an item ID that corresponds to several items, e.g., multi-item ID corresponds to stored item data in item database 48 for at least two items. For example, the received item ID such as multi-item ID-ABCD may correspond to stored item data of items A, B, C and D. Continuing the example, items A, B, C and D may be related items, unrelated items or any combination thereof and may correspond to items located within the store, items that will be available within the store, discounted items, among other items.

Time stamp data may be processed to determine time specific item data corresponding to item 54, i.e., determine item data that corresponds to the received item ID and time stamp data (Step S116). In particular, item database 48 may store predefined time criteria for one or more item IDs, including multi-item IDs. Multi-item IDs may be used in combination with display 56 that displays certain items to consumers at specific periods of time, e.g., store video display. For example, the predefined time criteria may indicate the periods of time corresponding to each item indicated in the multi-item ID. Continuing the example, the predefined time criteria for multi-item ID-ABCD may indicate that: item A is displayed during the hours of 9:00 am to 11:00 am, item B is displayed during the hours of 11:01 am to 1:00 pm, item C is displayed during the hours of 1:01 pm to 6:00 pm and item D is displayed during the hours of 6:01 pm to 9:00 pm. The received message including multi-item ID-ABCD and time stamp data indicating tag 14 was scanned at 5:45 pm, may be determined to correspond to item C, i.e., corresponds to stored item data of item C. After the specific item ID and corresponding item data are determined, item data corresponding to the determined item ID is selected, e.g., item data corresponding to item C (Step S118). The selected item data is transmitted to mobile device 12 for presentation on the display of mobile device display 12.

Continuing the example, display 56 may play video content for item C from 1:01 pm to 6:00 pm such that a consumer scanning tag 14, located proximate the display, at 5:00 pm may receive item data corresponding to item C. Moreover, the periods of time indicated in the predefined time criteria may vary based on user need. For example, the periods of time may be segmented into thirty minute periods in which each item ID may correspond to more than one time period. Also, the predefined time criteria may be used in conjunction with an item ID that corresponds to a single item that has multiple item data. For example, item F may have three different advertisements (multiple item data) in which each advertisement may correspond to a different time period as indicated in the predefined time criteria. In words, a consumer may receive different advertisement content (item data) for item F depending on when tag 14, corresponding to item F, is scanned by the consumer. Moreover, item pricing may be defined in the predefined time criteria such that the consumer may receive a different item price depending on when tag 14 was scanned, e.g., different item price at different times. Accordingly, mobile device 12 may receive customized item data corresponding to the item depending on the time when tag 14 was scanned, e.g., depending on time stamp data.

Figure 4:
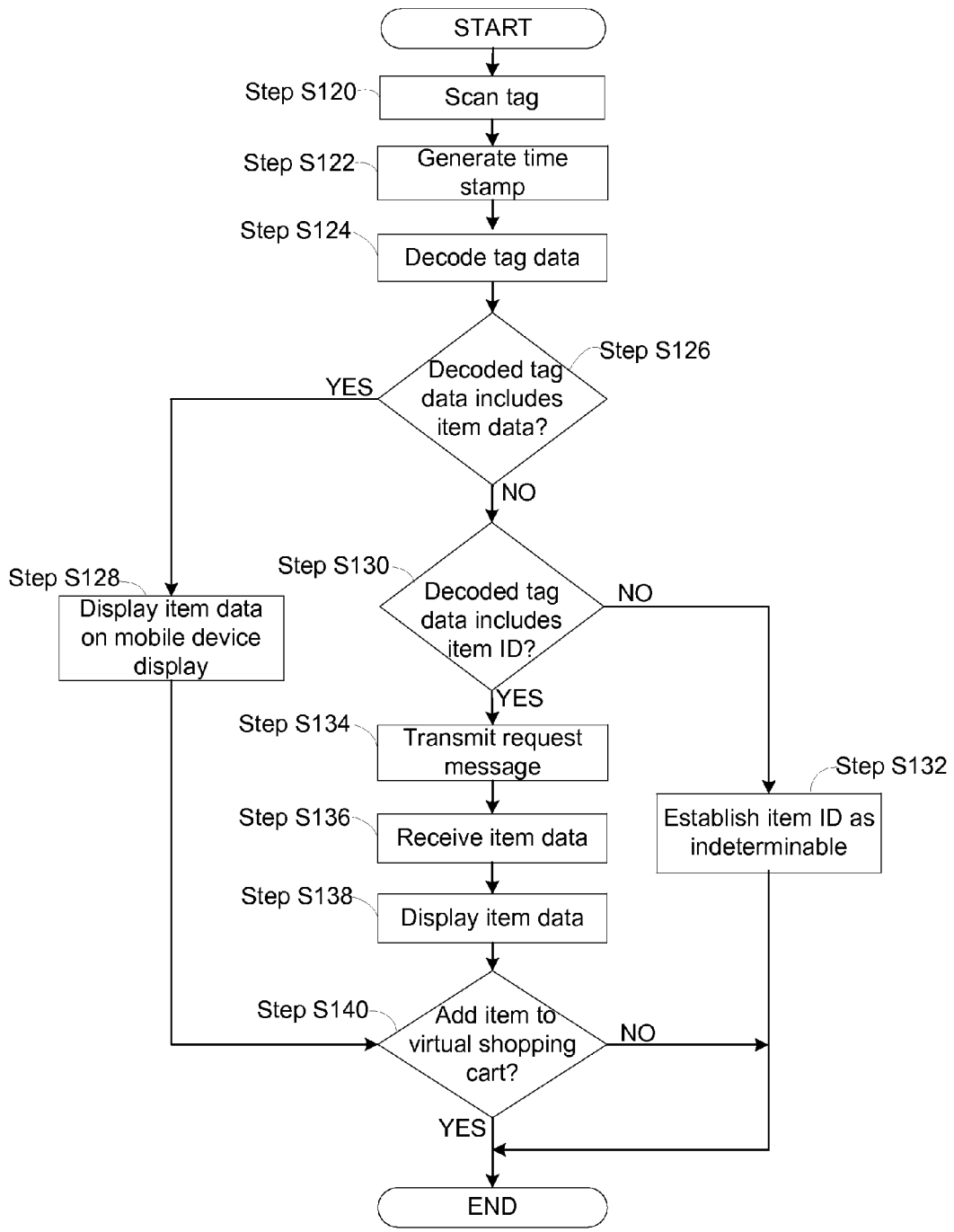
FIG. 4 is a flow chart of an exemplary process for a mobile device to request and receive item data.

An exemplary process used by mobile device 12 to request and receive item data is described with reference to FIG. 4. Product information module 30, stored on mobile device 12, initiates the process when tag 14 is scanned for tag data (Step S120). During or shortly after scanning tag 14, time stamp data may be generated by mobile device 12 and may be linked to the scanned tag 14 (Step S122). For example, time stamp data may include the time and/or date when tag 14 is scanned and may also include other time stamp data. The scanned tag data is decoded by mobile device 12 via methods known in the art (Step S124) and a determination is made whether the decoded tag data includes item data (Step S126). In other words, it is determined whether the decoded tag data includes item data similar to item data stored in item database 48. For example, the decoded tag data may include graphical and/or video content that may be displayed on the mobile device display. If it is determined that item data is included in the decoded tag data, mobile device 12 displays the item data on the mobile device display (Step S128). For example, tag 14 may be encoded with a graphical advertisement that may be displayed on mobile device 12 display without mobile device 12 sending a request message to server 16. Moreover, tag 14 may be encoded with other advertisement content such as one or more uniform resource locator(s) (URLs), among other content.

In particular, tag 14, encoded with item data, may be used in a variety of situations for various purposes. For example, tag 14 containing encoded item data may be used for advertisement content that requires a high level of reliability such that the consumer may still receive item data even if server 16 is not functioning or if network 18 is not functioning. Furthermore, tag 14 encoded with item data allows for rapid implementation that does not require server 16 to be updated with new item data. Also, using tag 14 encoded with item data allows third parties such as a manufacturer to provide tag 14, thereby not requiring the retail store to update server 16 with item data corresponding to new item 54 or a new item promotion. Therefore, tag 14 encoded with item data may decrease the processing and storage demands on server 16.

However, if item data is determined not to be not encoded in tag 14, a determination is made whether the decoded tag data contains an item ID (Step S130). For example, the tag data may contain an item ID corresponding to item data for a particular item 54 or may contain a multi-item ID corresponding to item data for multiple items. Moreover, other types of IDs may be used in accordance with the principles of the invention. For example, tag 14 may be encoded with a help ID such that mobile device 12 transmits a request (help) message to server 16 encoded with the help ID. In response, server 16 may alert store employee(s) that the consumer is requesting help at the location where tag 14 is located. The location of tag 14 may be predetermined by the vendor of the store that the consumer is shopping within and server 16 may be updated with the location of tag 14. Continuing the example, the store may have several areas indicated as help areas in which the consumer may scan tag 14 encoded with the help ID if the consumer wants to request help from an employee. Also, the scanned help ID may cause the product information module 30 to initiate a consumer help program before, during or after the request message, including the help ID, is transmitted to server 16.

If it is determined that no item ID is included in the tag data, mobile device 12 may transmit a message to server 16 indicating the item ID is indeterminable (Step S132). Also, mobile device 12 may notify a system administrator and/or the mobile device user (consumer). For example, mobile device 12 may prompt the consumer to rescan tag 14. However, if an item ID is determined to be included in the decoded tag data, mobile device 12 may transmit a request message (Step 134) including tag data and time stamp data to server 16 for processing in accordance with FIG. 3. Also, other data may be included in the request message. For example, the request message may include the mobile device number, customer identification number, among other data that may be processed to identify mobile device 12 and/or the consumer.

In response to the transmitted request message, mobile device 12 may receive item data from server 16 via network 18 (Step S136). For example, mobile device 12 may receive advertisement content (item data) such as graphical content, video content and/or other content that may be presented by mobile device 12, e.g., displayed, played and the like (Step S138). Also, mobile device 12 may prompt the consumer to add the item corresponding to the displayed item data to a virtual shopping cart (Step S140). For example, the virtual shopping cart may be a list of items stored in memory 28 that may be dynamically updated by the consumer and/or product information module 30. The list of items may include received item data corresponding to the items in the list.

Also, the mobile device user may have the option to store and retrieve tag data stored in memory 28 and/or memory 44. In particular, the mobile device user, e.g., consumer, may retrieve a stored tag data from tag 14 that was scanned in a previous visit along with any corresponding item data that was previously displayed. In other words, the mobile device user may retrieve item data without having to re-scan the tag and may retrieve a still valid coupon or offer (item data) that was previously displayed but may not longer be available. Moreover, mobile device user may retrieve and transmit tag data, item data and list of items, via network 18, to an email account.

Figure 5:
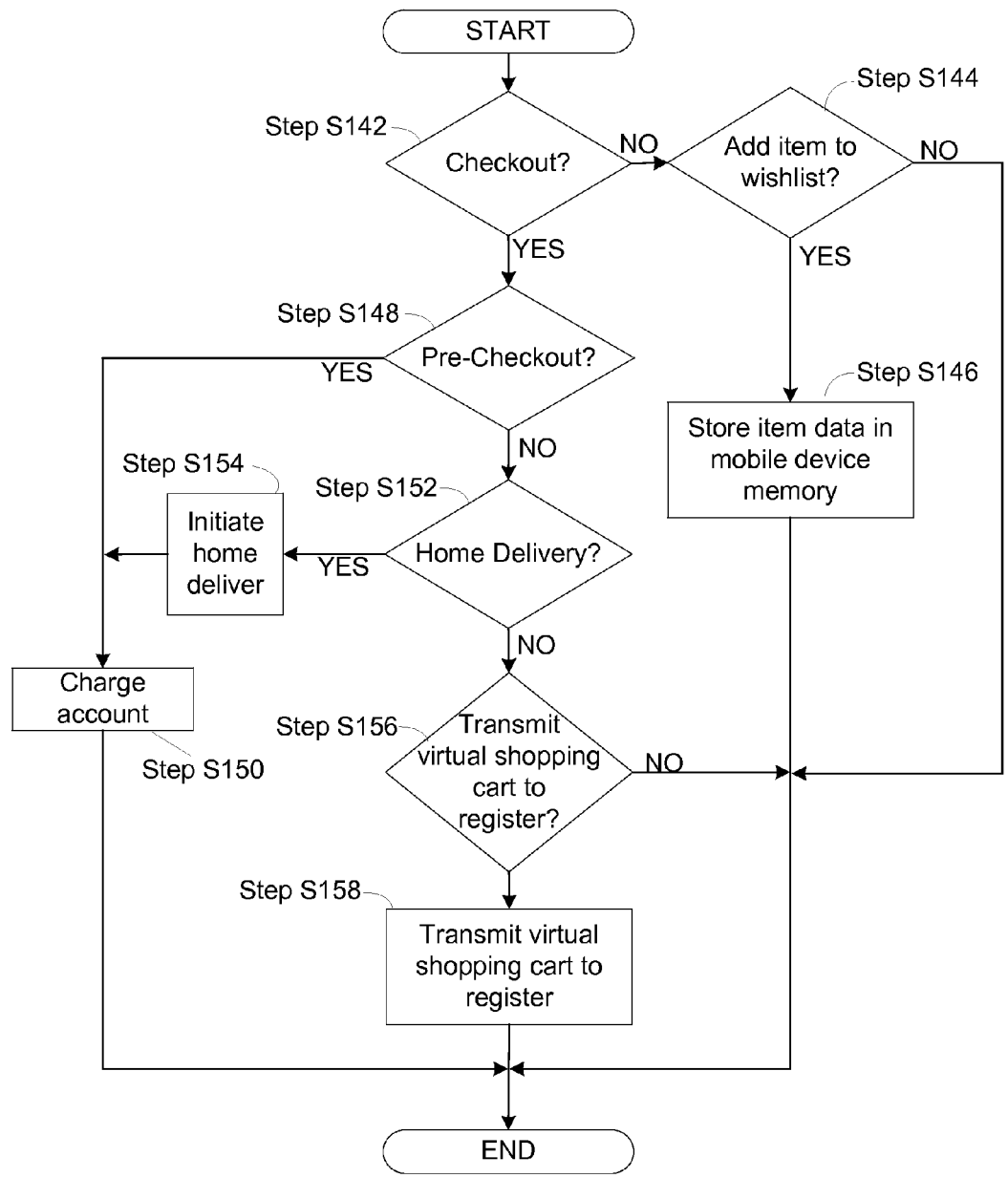
FIG. 5 is flow chart of an exemplary consumer checkout process using a virtual shopping cart.

An exemplary process for consumer checkout using the virtual shopping cart is described with reference to FIG. 5. Specifically, consumer checkout using the virtual shopping cart may be provided by product information module 30 and/or a checkout module (not shown) stored in memory 44 of server 16. In particular, the consumer using mobile device 12 may checkout using the virtual shopping cart with a predetermined vendor such as the vendor operating the store the consumer is shopping within, e.g., the vendor associated with item database 48. It is determined whether the mobile device user (consumer) wants to checkout (Step S142). For example, the server 16 may periodically transmit a message to the mobile device 12 prompting the user to checkout, may initiate checkout via a checkout button displayed on mobile device display, upon entrance into a checkout area of the store, among other checkout initiating events. If it is determined that the consumer does not want to checkout, a determination is made whether the consumer wants to add the items in the virtual shopping cart to the consumer's "wishlist." The wishlist may be a version of the virtual shopping cart that remains stored in memory 28 for use at a later time. If it is determined that the consumer wants to add the items to the wishlist, the items and corresponding item data are stored in memory 28 (Step S146). The consumer may convert the items in the wishlist into a virtual shopping cart and vice versa at any time. If it is determined no items are to be added to the wish list, the checkout process may end such that the consumer may continue shopping.

If it is determined the consumer wants to checkout, a determination is made whether the consumer wants to pre-checkout (Step S148). For example, the consumer may indicate a desire to pre-checkout by pressing or touching a particular button on mobile device 12. Upon determining the consumer wants to pre-checkout, mobile device 12 may transmit a purchase (checkout) message to server 16. The purchase message may contain consumer data such as an account number, mobile phone number, among other data that may be processed to identify the consumer or mobile device 12. Server 16 may use the received consumer data to search for the consumer's corresponding account data stored in consumer database 50, i.e., search consumer database 50 for account data that matches the received consumer data. Server 16 may use the matching account data to charge the purchase of the items in the virtual shopping cart to the consumer's credit card, debit card, bank account or other financial resource (Step S150).

However, if it is determined that the consumer does not want to pre-checkout, a determination is made whether the consumer wants home delivery of the items (Step S152). For example, the consumer may indicate by pressing or touching a button on mobile device 12 that home delivery of the items in the virtual shopping cart is requested. Upon determining the consumer has requested home delivery, mobile device 12 may transmit a purchase (checkout) message to server 16 indicating the consumer wants home delivery. Server 16 may initiate home delivery of the items in response to receiving the purchase message (Steps S154). For example, server 16 may transmit the order to the appropriate department and/or person such as an order delivery department. Also, mobile device 12 may transmit consumer data encoded in the purchase message such that the consumer may be charged for the purchase in substantially the same manner as described above with respect to Step S150.

If it was determined the consumer does not want home delivery of the items, then a determination is made whether the virtual shopping cart should be forwarded to a register (Step S156). For example, the consumer may indicate via touching or pressing a button on mobile device 12 that the consumer wants to forward the virtual shopping cart to a register for processing and payment. In particular, if it is determined the consumer wants to forward the virtual shopping cart to the register, mobile device 12 may transmit the virtual shopping cart to server 16, via network 18, in which server 16 may transmit the virtual shopping cart to the appropriate register for processing, e.g., transmit checkout message including the virtual shopping cart to a appropriate store register. Alternatively, the mobile device user may upload the virtual shopping cart directly to the register via network 18.

The present invention can be realized in a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A product information system, the system comprising:
    a server, including:
        at least one database storing:
            at least one item identifier and corresponding item data for at least one item; and
            item metrics different from item data, the item metrics including at least a frequency of capture of tag data by a plurality of portable wireless devices;
        a receiver configured to receive a message, the message including tag data captured from a tag by one of the plurality of portable wireless devices, the tag data including an item identifier;
        a processor configured to:
            in response to the received message, update the item metrics based on the received message and select item data from the item database corresponding to the received item identifier; and
            cause transmission of the item metrics if a request for the item metrics is received; and
        a transmitter configured to:
            transmit the selected item data to the one of the plurality of portable wireless devices; and
            transmit the item metrics in response to the received request.

2. The system of claim 1, wherein the at least one item identifier is a unique identification character sequence for the at least one item.

3. The system of claim 1, wherein the message includes time stamp data indicating a time when the tag data was captured, and the selected item data corresponds to the time stamp data.

4. The system of claim 3, wherein the item data includes at least one of an item description, item pricing information, item warranty, customer reviews of item, graphical content, video content and item availability.

5. The system of claim 1, wherein the tag is a near-field communication (NFC) tag that is removably affixable to at least one of a fixture, item and item enclosure.

6. The system of claim 1, wherein the at least one database further stores consumer data corresponding to at least one portable wireless device user, the consumer data including a mobile device identification number corresponding to the transmitting device and scanning history data specific to at least one of the transmitting device and the item identifier, and the selected item data is based, in part, on the consumer data.

7. The system of claim 1, wherein the receiver receives a checkout message, and the processor is further configured, in response to the received checkout message, to initiate consumer checkout of at least one item associated with the tag identifier.

8. A mobile device application method for requesting product information, the method comprising:
    capturing tag data with a portable wireless device, the tag data including an item identifier;
    transmitting the tag data to a server in communication with at least one database, the transmitted tag data causing the server to:
        store a mobile device identification number corresponding to the portable wireless device in the at least one database; and
        update scanning history data based on the transmitted tag data, the scanning history data being specific to the mobile device identification number; and
    receiving item data in response to the transmitted tag data, the item data corresponding to the item identifier and selected, at least in part, based on the scanning history data.

9. The method of claim 8, wherein the transmitted tag data includes time stamp data indicating a time when the tag data was captured, and the received item data corresponds to the time stamp data.

10. The method of claim 8, further comprising transmitting a checkout message to the server, the checkout message initiating consumer checkout of at least one item associated with the item identifier.

11. The method of claim 8, wherein the received item data includes at least one of an item description, item pricing information, item warranty, customer reviews of item, graphical content, video content and item availability.

12. The method of claim 8, further comprising:
    transmitting a checkout message, the checkout message initiating payment and delivery for at least one item corresponding to the captured tag data.

13. The method of claim 8, further comprising initiating consumer checkout of items corresponding to the received item data.

14. A method for providing product information to a mobile device, the method comprising:
    storing at least one item identifier and corresponding item data for at least one item in an item database, the item database being associated with a predetermined vendor;
    receiving a message, the message including tag data captured from a tag by a portable wireless device, the tag data including an item identifier;
    storing a mobile device identification number corresponding to the transmitting device in a database;
    updating item metrics based at least in part on the received message, the item metrics being based at least in part on a frequency of capture of tag data associated with the at least one item by a plurality of portable wireless devices;
    selecting item data from the item database corresponding to the received item identifier in response to the received message;
    transmitting the selected item data to the portable wireless device; and
    transmitting the item metrics if a request for the item metrics is received.

15. The method of claim 14, wherein the received message includes time stamp data, the selected item data corresponding to the time stamp data.

16. The method of claim 14, wherein the at least one item identifier is a unique identification character sequence for the at least one item.

17. The method of claim 14, wherein the item data includes a location of the tag predetermined by the vendor, and the method further comprises:

receiving a help message indicating the location of a tag captured by the portable wireless device; and generating an alert in response to the received help message, the alert indicating assistance is requested at the location of the captured tag.

18. The method of claim 14, wherein item data includes at least one of an item description, item pricing information, item warranty, customer reviews of item, graphical content, video content and item availability.

19. The method of claim 14, further comprising:

receiving a checkout message; and in response to receiving checkout message, initiating a consumer checkout with the predetermined vendor.

20. The method of claim 19, further comprising periodically transmitting a message to the wireless mobile device prompting checkout.

21. The system of claim 1, wherein the item metrics include at least one of: the frequency at which a tag is scanned within a defined time period, the frequency at which tags associated with a plurality of items in a defined category are scanned within a defined time period, and a number of times within a defined time period a consumer checkout has been initiated for the item.

22. The system of claim 21, wherein the item metrics further include inventory information for the at least one item.

23. The method of claim 14, wherein the item metrics include at least one of: the frequency at which a tag is scanned within a defined time period, the frequency at which tags associated with a plurality of items in a defined category are scanned within a defined time period, and a number of times within a defined time period a consumer checkout has been initiated for the item.

24. The system of claim 6, wherein the consumer data further includes at least one of a consumer account number, a personal identification number, credit card account information, financial institution information and consumer purchase history data.

25. The method of claim 8, further comprising transmitting a help message indicating:

a location of a tag captured with the portable wireless device; and assistance is requested at the location of the captured tag.

26. The method of claim 13, further comprising:

transmitting a checkout message, the checkout message initiating payment and delivery of at least one item corresponding to the captured tag data.

* * * * *